US009305504B2

(12) United States Patent
Yu et al.

(10) Patent No.: US 9,305,504 B2
(45) Date of Patent: Apr. 5, 2016

(54) DISPLAY DEVICE AND LIQUID CRYSTAL DISPLAY PANEL HAVING A PLURALITY OF COMMON ELECTRODES

(71) Applicant: Novatek Microelectronics Corp., Hsinchu (TW)

(72) Inventors: Teng-Jui Yu, Taoyuan County (TW); Li-Tang Lin, Hsinchu (TW); Chia-Wei Su, Hsinchu (TW); Chu-Ya Hsiao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 99 days.

(21) Appl. No.: 14/074,730

(22) Filed: Nov. 8, 2013

(65) Prior Publication Data

US 2015/0070338 A1 Mar. 12, 2015

(30) Foreign Application Priority Data

Sep. 6, 2013 (TW) ............................. 102132253 A

(51) Int. Cl.
*G06F 3/038* (2013.01)
*G09G 5/00* (2006.01)
*G09G 3/36* (2006.01)

(52) U.S. Cl.
CPC ............ *G09G 3/3648* (2013.01); *G09G 3/3614* (2013.01)

(58) Field of Classification Search
CPC ........................... G09G 3/3614; G09G 3/3648
USPC .................................................. 345/211–213
See application file for complete search history.

(56) References Cited

U.S. PATENT DOCUMENTS

2010/0110057 A1* 5/2010 Lee et al. ...................... 345/211
2011/0193769 A1* 8/2011 Ohgami ............ G02F 1/134309 345/87
2014/0313113 A1* 10/2014 Jang ..................... G09G 3/3614 345/87

FOREIGN PATENT DOCUMENTS

JP 2008233416 10/2008

OTHER PUBLICATIONS

"Office Action of Taiwan Counterpart Application", issued on Apr. 28, 2015, p. 1-p. 5, in which the listed references were cited.

* cited by examiner

*Primary Examiner* — Long D Pham
(74) *Attorney, Agent, or Firm* — Jianq Chyun IP Office

(57) ABSTRACT

A liquid crystal display panel and a display device are provided. The liquid crystal display includes a first common electrode, a second common electrode and pixels. The second common electrode and the first common electrode are electrically independent from each other. First pixels of the pixels are coupled to the first common electrode, and second pixels of the pixels are coupled to the second common electrode. Accordingly, usage or operation of the liquid crystal display panel is more flexible.

9 Claims, 16 Drawing Sheets

DISPLAY DEVICE AND LIQUID CRYSTAL DISPLAY PANEL HAVING A PLURALITY OF COMMON ELECTRODES

CROSS-REFERENCE TO RELATED APPLICATION

This application claims the priority benefit of Taiwan application serial no. 102132253, filed on Sep. 6, 2013. The entirety of the above-mentioned patent application is hereby incorporated by reference herein and made a part of this specification.

BACKGROUND OF THE INVENTION

1. Field of the Invention

The invention relates to a display technology, and more particularly, to a display device and a liquid crystal display panel.

2. Description of Related Art

Generally, a liquid crystal display panel includes a plurality of pixels arranged in a matrix. The pixels are coupled to data lines and scan lines. Voltage on the scan lines is configured to control a switch element in the pixel, and voltage on the data lines is configured to be applied to a terminal of a pixel capacitor in the pixel. Another terminal of the pixel capacitor is coupled to a common electrode, and a potential difference between the two terminals of the pixel capacitor can be used to change a rotating angle of a liquid crystal, thereby changing a color or a brightness displayed by the liquid crystal display panel. The potential difference of the pixel capacitor can be changed by changing a potential on the common electrode. The potential on the common electrode are different based on different operations. Therefore, it has become one major concern for persons skilled in the art in designing a circuitry within the liquid crystal display panel in which usage or operation of the liquid crystal display panel can be more flexible.

SUMMARY OF THE INVENTION

The invention is directed to a liquid crystal display panel and a display device using the liquid crystal display panel, in which usage or operation of the liquid crystal display panel can be more flexible.

In an exemplary embodiment of the invention, the liquid crystal display panel includes a first common electrode, a second common electrode and a plurality of pixels. The second common electrode and the first common electrode are electrically independent from each other. First pixels of the pixels are coupled to the first common electrode, and second pixels of the pixels are coupled to the second common electrode.

In an exemplary embodiment, the liquid crystal display panel further includes a plurality of data lines and a plurality of scan lines. Each of the pixels includes a switch element, a storage capacitor and a pixel capacitor. A control terminal of the switch element is coupled to one of the scan lines, and a first terminal of the switch element is coupled to one of the data line. A first terminal of the pixel capacitor is coupled to a second terminal of the switch element, and a second terminal of the pixel capacitor is coupled to a first common electrode or a second common electrode. A first terminal of the storage capacitor is coupled to the second terminal of the switch element, and a second terminal of the pixel capacitor is coupled to the first common electrode or the second common electrode.

In an exemplary embodiment, each of the pixels is located on at least one data line and at least one scan line. The pixel located on a $i^{th}$ data line and a $j^{th}$ scan line is coupled to the first common electrode and coupled to the pixel located on a $(i+1)^{th}$ data line and a $(j+1)^{th}$ scan line through a first wire. The pixel located on the $(i+1)^{th}$ data line and the $(j+1)^{th}$ scan line is coupled to the pixel located on a $(i+2)^{th}$ data line and the $j^{th}$ scan line through a second wire. The pixel located on the $(i+1)^{th}$ data line and the $(j+1)^{th}$ scan line is coupled to the pixel located on the $i^{th}$ data line and a $(j+2)^{th}$ scan line through a third wire. The pixel located on the $(i+1)^{th}$ data line and the $(j+1)^{th}$ scan line is coupled to the pixel located on the $(i+2)^{th}$ data line and the $(j+2)^{th}$ scan line through a fourth wire. Therein, i and j are positive integers. In addition, the pixel located on the $(i+1)^{th}$ data line and the $j^{th}$ scan line is coupled to the second common electrode and coupled to the pixel located on the $(i+2)^{th}$ data line and the $(j+1)^{th}$ scan line through a fifth wire. The pixel located on the $(i+2)^{th}$ data line and the $(j+1)^{th}$ scan line is coupled to the pixel located on a $(i+3)^{th}$ data line and the $j^{th}$ scan line through a sixth wire. The pixel located on the $(i+2)^{th}$ data line and the $(j+1)^{th}$ scan line is coupled to the pixel located on the $(i+1)^{th}$ data line and the $(j+2)^{th}$ scan line through a seventh wire. The pixel located on the $(i+2)^{th}$ data line and the $(j+1)^{th}$ scan line is coupled to the pixel located on the $(i+3)^{th}$ data line and the $(j+2)^{th}$ scan line through an eighth wire.

In an exemplary embodiment, the pixel located on the $i^{th}$ data line and the $j^{th}$ scan line is coupled to the first common electrode and coupled to the pixel located on the $(i+1)^{th}$ data line and the $(j+1)^{th}$ scan line through a first wire. The pixel located on the $(i+1)^{th}$ data line and the $(j+1)^{th}$ scan line is coupled to the pixel located on the $i^{th}$ data line and the $(j+2)^{th}$ scan line through a second wire. The pixel located on the $(i+1)^{th}$ data line and the $j^{th}$ scan line is coupled to the second common electrode and coupled to the pixel located on the $(i+2)^{th}$ data line and the $(j+1)^{th}$ scan line through a third wire. The pixel located on the $(i+2)^{th}$ data line and the $(j+1)^{th}$ scan line is coupled to the pixel located on the $(i+1)^{th}$ data line and the $(j+2)^{th}$ scan line through a fourth wire.

In an exemplary embodiment, the pixel located on the $(i+1)^{th}$ data line and the $j^{th}$ scan line is coupled to the second common electrode and coupled to the pixel located on the $i^{th}$ data line and the $(j+1)^{th}$ scan line through a first wire. The pixel located on the $i^{th}$ data line and the $(j+1)^{th}$ scan line is coupled to the pixel located on the $(i+1)^{th}$ data line and the $(j+2)^{th}$ scan line through a second wire. The pixel located on the $(i+2)^{th}$ data line and the $j^{th}$ scan line is coupled to the first common electrode and coupled to the pixel located on the $(i+1)^{th}$ data line and the $(j+1)^{th}$ scan line through a third wire. The pixel located on the $(i+1)^{th}$ data line and the $(j+1)^{th}$ scan line is coupled to the pixel located on the $(i+2)^{th}$ data line and the $(j+2)^{th}$ scan line through a fourth wire.

In an exemplary embodiment, the pixel located on the $i^{th}$ data line and the $(j+1)^{th}$ scan line is coupled to the second common electrode and coupled to the pixel located on the $(i+1)^{th}$ data line and the $j^{th}$ scan line through a first wire. The pixel located on the $(i+1)^{th}$ data line and the $j^{th}$ scan line is coupled to the pixel located on the $(i+2)^{th}$ data line and the $(j+1)^{th}$ scan line through a second wire. The pixel located on the $i^{th}$ data line and the $(j+2)^{th}$ scan line is coupled to the first common electrode and coupled to the pixel located on the $(i+1)^{th}$ data line and the $(j+1)^{th}$ scan line through a third wire. The pixel located on the $(i+1)^{th}$ data line and the $(j+1)^{th}$ scan line is coupled to the pixel located on the $(i+2)^{th}$ data line and the $(j+3)^{th}$ scan line through a fourth wire.

In an exemplary embodiment, the pixel located on the $i^{th}$ data line and the $j^{th}$ scan line is coupled to the first common electrode and coupled to the pixel located on the $(i+1)^{th}$ data line and the $(j+1)^{th}$ scan line through a first wire. The pixel located on the $(i+1)^{th}$ data line and the $(j+1)^{th}$ scan line is coupled to the pixel located on the $(i+2)^{th}$ data line and the $j^{th}$ scan line through a second wire. The pixel located on the $i^{th}$ data line and the $(j+1)^{th}$ scan line is coupled to the second common electrode and coupled to the pixel located on the $(i+1)^{th}$ data line and the $(j+2)^{th}$ scan line through a third wire. The pixel located on the $(i+1)^{th}$ data line and the $(j+2)^{th}$ scan line is coupled to the pixel located on the $(i+2)^{th}$ data line and the $(j+1)^{th}$ scan line through a fourth wire.

In an exemplary embodiment, the pixel located on the $i^{th}$ data line and the $j^{th}$ scan line is coupled to the first common electrode and coupled to the pixel located on the $i^{th}$ data line and the $(j+2)^{th}$ scan line through a first wire. The pixel located on the $i^{th}$ data line and the $(j+1)^{th}$ scan line is coupled to the second common electrode and coupled to the pixel located on the $i^{th}$ data line and a $(j+3)^{th}$ scan line, the pixel located on the $(i+1)^{th}$ data line and the $j^{th}$ scan line, and the pixel located on the $(i+1)^{th}$ data line and the $(j+2)^{th}$ scan line through a second wire.

In an exemplary embodiment, the pixel located on the $i^{th}$ data line and the $j^{th}$ scan line is coupled to the first common electrode and coupled to the pixel located on the $i^{th}$ data line and the $(j+2)^{th}$ scan line, the pixel located on the $(i+1)^{th}$ data line and the $(j+1)^{th}$ scan line, and the pixel located on the $(i+1)^{th}$ data line and the $(j+3)^{th}$ scan line through a first wire. The pixel located on the $i^{th}$ data line and the $(j+1)^{th}$ scan line is coupled to the second common electrode and coupled to the pixel located on the $i^{th}$ data line and the $(j+3)^{th}$ scan line through a second wire.

In an exemplary embodiment, the pixel located on the $i^{th}$ data line and the $j^{th}$ scan line is coupled to the first common electrode and coupled to the pixel located on the $(i+2)^{th}$ data line and the $j^{th}$ scan line through a first wire. The pixel located on the $(i+1)^{th}$ data line and the $j^{th}$ scan line is coupled to the second common electrode and coupled to the pixel located on the $(i+3)^{th}$ data line and the $j^{th}$ scan line, the pixel located on the $i^{th}$ data line and the $(j+1)^{th}$ scan line, and the pixel located on the $(i+2)^{th}$ data line and the $(j+1)^{th}$ scan line through a second wire.

In an exemplary embodiment, the pixel located on the $i^{th}$ data line and the $j^{th}$ scan line is coupled to the first common electrode and coupled to the pixel located on the $(i+2)^{th}$ data line and the $j^{th}$ scan line, the pixel located on the $(i+1)^{th}$ data line and the $(j+1)^{th}$ scan line, and the pixel located on the $(i+3)^{th}$ data line and the $(j+1)^{th}$ scan line through a first wire. The pixel located on the $(i+1)^{th}$ data line and the $j^{th}$ scan line is coupled to the second common electrode and coupled to the pixel located on the $(i+3)^{th}$ data line and the $j^{th}$ scan line through a second wire.

In an exemplary embodiment, the pixel located on the $i^{th}$ data line and the $j^{th}$ scan line is coupled to the first common electrode and coupled to the pixel located on the $i^{th}$ data line and the $(j+2)^{th}$ scan line through a first wire. The pixel located on the $i^{th}$ data line and the $(j+1)^{th}$ scan line is coupled to the second common electrode and coupled to the pixel located on the $i^{th}$ data line and the $(j+3)^{th}$ scan line through a second wire.

In an exemplary embodiment, the first wire crosses over the pixel located on the $i^{th}$ data line and the $(j+1)^{th}$ scan line, and the second wire crosses over the pixel located on the $i^{th}$ data line and the $(j+2)^{th}$ scan line.

In an exemplary embodiment, the pixel located on the $i^{th}$ data line and the $j^{th}$ scan line is coupled to the first common electrode and coupled to the pixel located on the $(i+2)^{th}$ data line and the $j^{th}$ scan line through a first wire. The pixel located on the $(i+1)^{th}$ data line and the $j^{th}$ scan line is coupled to the second common electrode and coupled to the pixel located on the $(i+3)^{th}$ data line and the $j^{th}$ scan line through a second wire.

In an exemplary embodiment, the first wire crosses over the pixel located on the $(i+1)^{th}$ data line and the $j^{th}$ scan line, and the second wire crosses over the pixel located on the $(i+2)^{th}$ data line and the $j^{th}$ scan line.

In an exemplary embodiment, the pixels located on the same data line are all coupled to the first common electrode or the second common electrode.

In an exemplary embodiment, the pixels located on the same scan line are all coupled to the first common electrode or the second common electrode.

In an exemplary embodiment, the pixel located on the $i^{th}$ data line and the $j^{th}$ scan line and the pixel located on the $i^{th}$ data line and the $(j+1)^{th}$ scan line are coupled to the first common electrode. The pixel located on the $(i+1)^{th}$ data line and the $j^{th}$ scan line and the pixel located on the $(i+1)^{th}$ data line and the $(j+1)^{th}$ scan line are coupled to the second common electrode.

In an exemplary embodiment, the pixel located on the $i^{th}$ data line and the $j^{th}$ scan line and the pixel located on the $(i+1)^{th}$ data line and the $j^{th}$ scan line are coupled to the first common electrode. The pixel located on the $i^{th}$ data line and the $(j+1)^{th}$ scan line and the pixel located on the $(i+1)^{th}$ data line and the $(j+1)^{th}$ scan line are coupled to the second common electrode.

In an exemplary embodiment of the invention, the display device includes a data driver, a scan driver and a liquid crystal display panel. The data driver is coupled to a plurality of data lines. The scan driver is coupled to a plurality of scan lines. The liquid crystal display panel is coupled to the data lines and the scan lines. The liquid crystal display includes a first common electrode, a second common electrode and pixels. The second common electrode and the first common electrode are electrically independent from each other. First pixels of the pixels are coupled to the first common electrode, and second pixels of the pixels are coupled to the second common electrode.

In summary, in the display device and the liquid crystal display panel provided in the exemplary embodiments of the invention, more than two common electrodes are disposed. Accordingly, usage or operation of the liquid crystal display panel is more flexible.

To make the above features and advantages of the disclosure more comprehensible, several embodiments accompanied with drawings are described in detail as follows.

DESCRIPTION OF THE EMBODIMENTS

Figure 1:
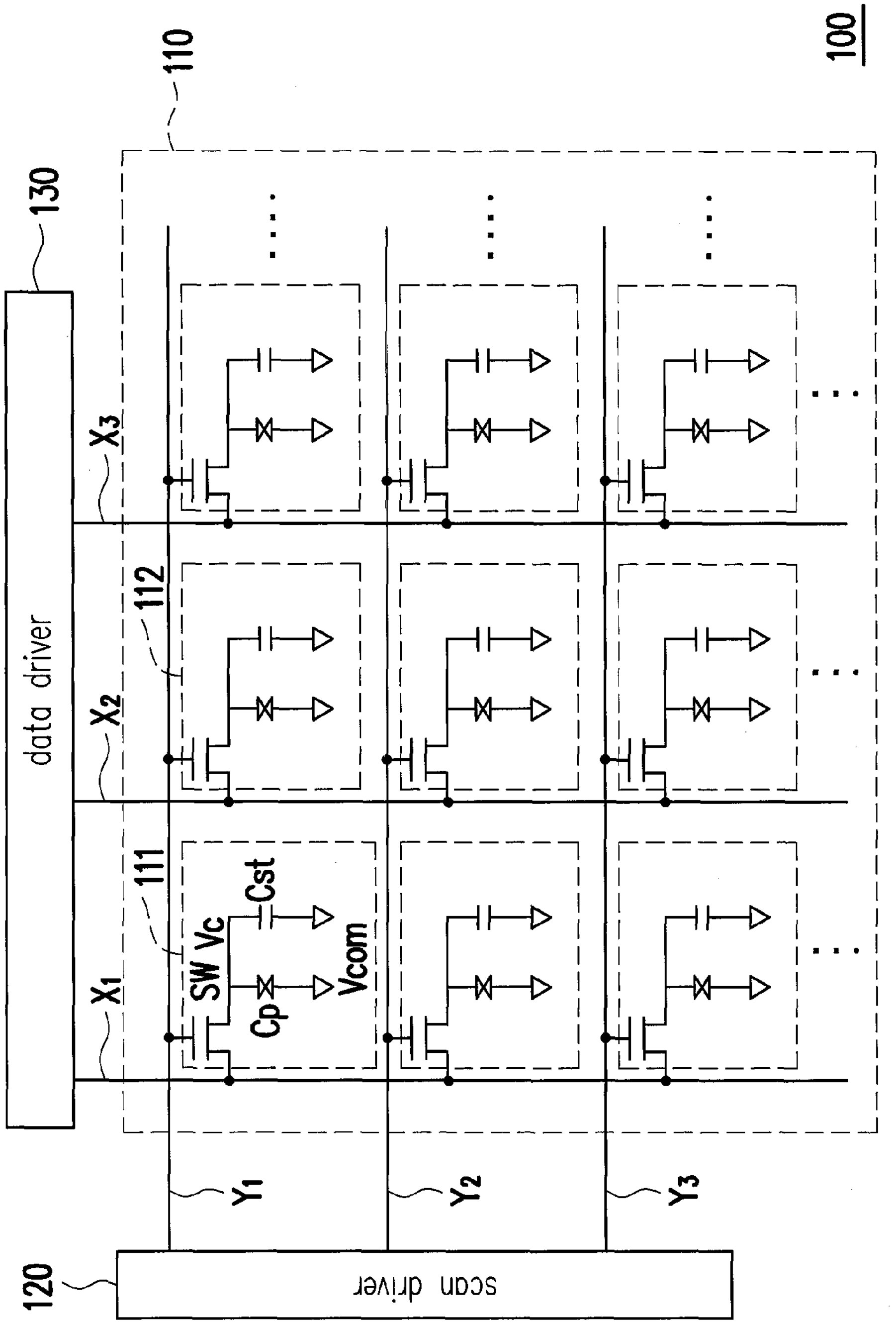
FIG. 1 is a schematic diagram illustrating functional blocks of a display device according to an exemplary embodiment.

FIG. 1 is a schematic diagram illustrating functional blocks of a display device according to an exemplary embodiment. Referring to FIG. 1, a display device 100 includes a liquid crystal display panel 110, a scan driver 120 and a data driver 130. The display device 100 may be any electronic devices including televisions, computers, cell phones, digital cameras, but the invention is not limited thereto.

The liquid crystal display panel 110 includes a plurality of scan lines (Y1, Y2 and Y3) and a plurality of data lines (X1, X2 and X3). The scan driver 120 is coupled to the scan lines Y1 to Y3. The data driver 130 is coupled to the data lines X1 to X3. The liquid crystal display panel 110 further includes a plurality of pixels, and each of the pixels is located on one or more scan lines and one ore more data lines. For instance, a pixel 111 is disposed on the scan line Y1 and the data line X1. Herein, the pixel 111 is illustrated as an example, and other pixels can refer to the same description for the pixel 111. Each of the pixels (e.g., the pixel 111) includes a switch element SW, a storage capacitor Cst and a pixel capacitor Cp. In addition, the switch element SW can be a thin film transistor (TFT) or other controlled switches. A first terminal of the switch element SW is coupled to the data line X1, and a control terminal of the switch element SW is coupled to the scan line Y1. First terminals of the pixel capacitor Cp and the storage capacitor Cst are coupled to a second terminal of the switch element SW, and second terminals of the pixel capacitor Cp and the storage capacitor Cst are coupled to a common electrode. However, in other embodiments, each of the pixels may also include more than two switch elements SW, more than two storage capacitors Cst, or more than two pixel capacitors Cp. In addition, the switch element SW, the storage capacitor Cst and the pixel capacitor Cp may also have other coupling relations. The invention is not limited by amounts and coupling relations of the switch element, the storage capacitor and the pixel capacitor.

When the switch element SW is turned on, the data driver 130 outputs a driving voltage Vc to the pixel capacitor Cp and the storage capacitor Cst. When the switch element SW is turned off, the driving voltage Vc is maintained in the pixel 111, and a voltage difference between two electrodes of the pixel capacitor Cp is formed by the driving voltage Vc and a common voltage Vcom. A display medium (e.g., a liquid crystal) is disposed between the two electrodes of the pixel capacitor Cp, and the voltage difference between the two electrodes of the pixel capacitor Cp changes a rotating angle of the liquid crystal. In particular, a plurality of common electrodes are disposed in the display panel 110, and different pixels may be coupled to different common electrodes. For instance, the pixel 111 is coupled to a first common electrode, and a pixel 112 is coupled to a second common electrode. Therein, the first common electrode and the second common electrode are electrically independent from each other. In other words, a potential on the first common electrode is different from a potential on the second common electrode. In an exemplary embodiment, the potentials on the first common electrode and the second common electrode can be used to control a phenomenon of polarity inversion. However, in the invention, magnitudes of the potentials on the first common electrode and second common electrode are not limited, and what sort of operations the potentials are used for is not limited either.

FIG. 2 through FIG. 30 are schematic diagrams illustrating a plurality of common electrodes according to exemplary embodiments.

Figure 2:
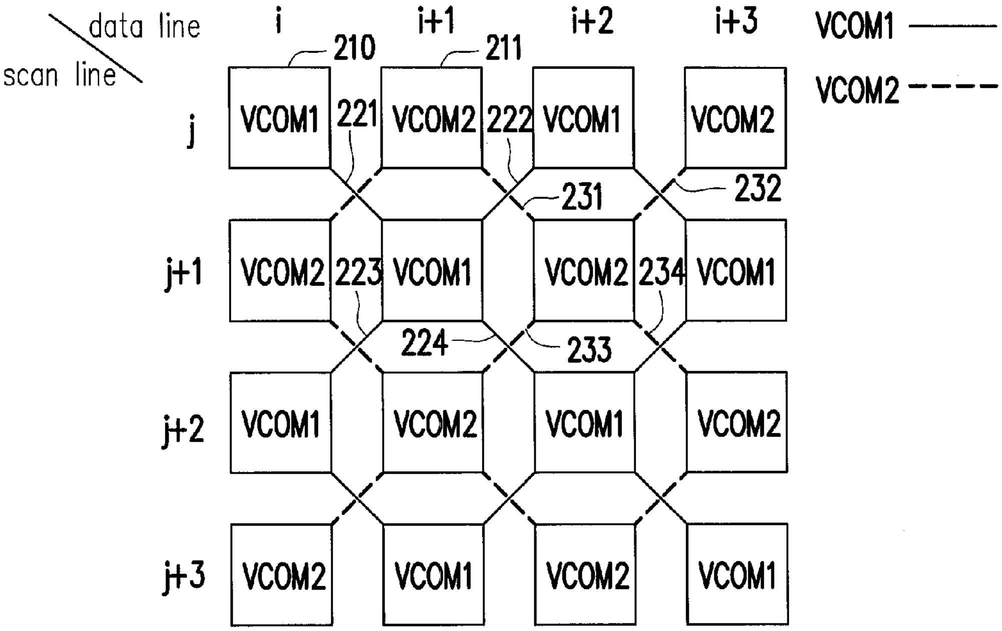
FIG. 2 through FIG. 30 are schematic diagrams illustrating a plurality of common electrodes according to exemplary embodiments.

Referring FIG. 2, for a simpler view, only the pixels and a plurality of wires by which the common electrodes are coupled are illustrated in the exemplary embodiment of FIG. 2, and VCOM1/VCOM 2 denote the corresponding common electrode of each pixel, so as to describe the coupling relation between the pixels and the common electrodes. Herein, a position of one pixel is indicated by the data line and the scan line. For instance, a pixel 210 is located on a $i^{th}$ data line and a $j^{th}$ scan line. Therein, i and j are positive integers, but values of the positive integers i and j are not particularly limited in the invention. On the other hand, "VCOM1" marked in one pixel indicates that the corresponding pixel is coupled to the first common electrode, whereas "VCOM2" indicates that the corresponding pixel is coupled to the second common electrode. For instance, the pixel 210 is coupled to the first common electrode, and a pixel 211 is coupled to the second common electrode. In addition, in FIG. 2, full lines are used to indicate the wires by which the first common electrodes are coupled, and dashed lines are used to indicate the wires by which the second common electrode are coupled.

In the exemplary embodiment of FIG. 2, the pixels are coupled to the first common electrodes and the second common electrodes disposed in form of a chessboard. More specifically, the pixel 210 located on the $i^{th}$ data line and the $j^{th}$ scan line, called p(i, j) hereinafter, is coupled to the first common electrode, and the first common electrode of the pixel p(i, j) is coupled to the first common electrode of the pixel located on a $(i+1)^{th}$ data line and a $(j+1)^{th}$ scan line, called p(i+1, j+1) hereinafter, through a wire 221. The first common electrode of the pixel p(i+1, j+1) is coupled to the first common electrode of the pixel p(i+2, j) located on a $(i+2)^{th}$ data line and the $j^{th}$ scan line through a wire 222. The first common electrode of the pixel p(i+1, j+1) is coupled to the first common electrode of the pixel p(i, j+2) located on the $i^{th}$ data line and a $(j+2)^{th}$ scan line through a wire 223. The first common electrode of the pixel p(i+1, j+1) located on the $(i+1)^{th}$ data line and the $(j+1)^{th}$ scan line is coupled to the first common electrode of the pixel p(i+2, j+2) located on the $(i+2)^{th}$ data line and the $(j+2)^{th}$ scan line through a wire 224. In addition, the pixel 211 as p(i+1, j) located on the $(i+1)^{th}$ data line and the $j^{th}$ scan line is coupled to the second common electrode, and the second common electrode of the pixel 211, p(i+1, j), is coupled to the second common electrode of the pixel p(i+2, j+1) located on the $(i+2)^{th}$ data line and the $(j+1)^{th}$ scan line through a wire 231. The second common electrode of the pixel p(i+2, j+1) is coupled to the second common electrode of the pixel p(i+3, j) located on a $(i+3)^{th}$ data line and the $j^{th}$ scan line through a wire 232. The second common electrode of the pixel p(i+2, j+1) is coupled to the second common electrode of the pixel p(i+1, j+2) located on the $(i+1)^{th}$ data line and the $(j+2)^{th}$ scan line through a wire 233. The second common electrode of the pixel p(i+2, j+1) is coupled to the second common electrode of the pixel p(i+3, j+2) located on the $(i+3)^{th}$ data line and the $(j+2)^{th}$ scan line through a wire 234.

It should be noted that in FIG. 2, the wire 222 and the wire 231 are crossed over each other. In an exemplary embodiment, the wire 222 and the wire 231 are disposed on different layers in a die, and each of the layers are corresponded to one mask process. For instance, the wire 222 is disposed on a first metal layer, and the wire 231 is disposed on a second metal layer. However, in FIG. 2 of the invention, the wires are not limited to be disposed on which layer, and a material of the wires is not limited either. For instance, the material of the wires may be an aluminum, a copper, an indium tin oxide (ITO), a transparent conductive film, or any conducting materials. In all of exemplary embodiments in FIG. 3 through FIG. 30, the wires are not limited to be disposed to which layer, and the material of the wires is not limited either, and related descriptions thereto are not repeated hereinafter.

Figure 3:
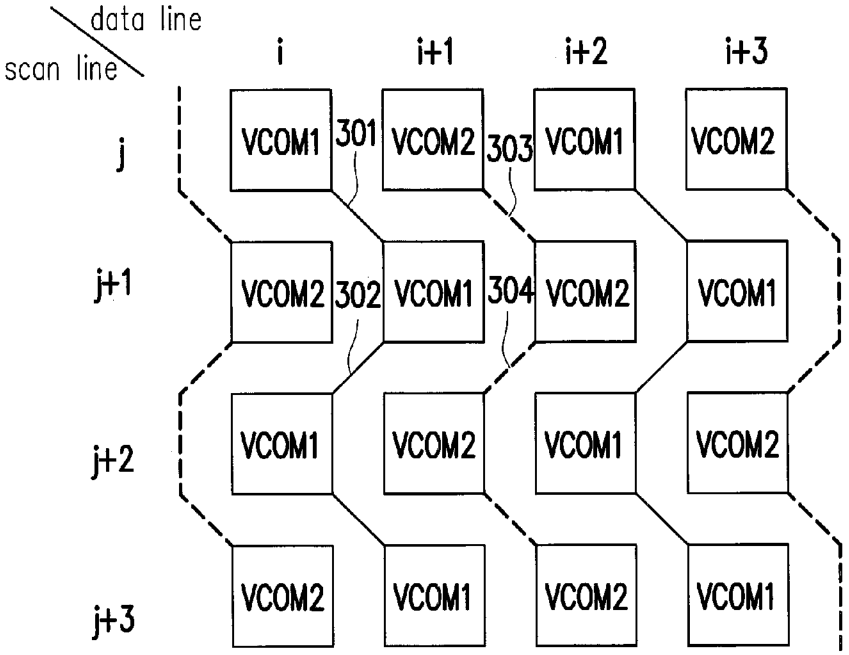

Referring to FIG. 3, in the exemplary embodiment of FIG. 3, the pixels are coupled to the first common electrodes or the second common electrodes in form of a serration along longitudinal direction. More specifically, the pixel p(i, j) located on the $i^{th}$ data line and the $j^{th}$ scan line is coupled to the first common electrode, and the first common electrode of the pixel p(i, j) is coupled to the first common electrode of the pixel p(i+1, j+1) located on the $(i+1)^{th}$ data line and the $(j+1)^{th}$ scan line through a wire 301. The first common electrode of the pixel p(i+1, j+1) is coupled to the first common electrode of the pixel p(i, j+2) located on the $i^{th}$ data line and the $(j+2)^{th}$ scan line through a wire 302. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+2, j+1) located on the $(i+2)^{th}$ data line and the $(j+1)^{th}$ scan line through a wire 303. The second common electrode of the pixel p(i+2, j+1) is coupled to the second common electrode of the pixel p(i+1, j+2) located on the $(i+1)^{th}$ data line and the $(j+2)^{th}$ scan line through a wire 304. The rest of the coupling relations are as illustrated in the figure, thus related description is omitted hereinafter.

Figure 4:
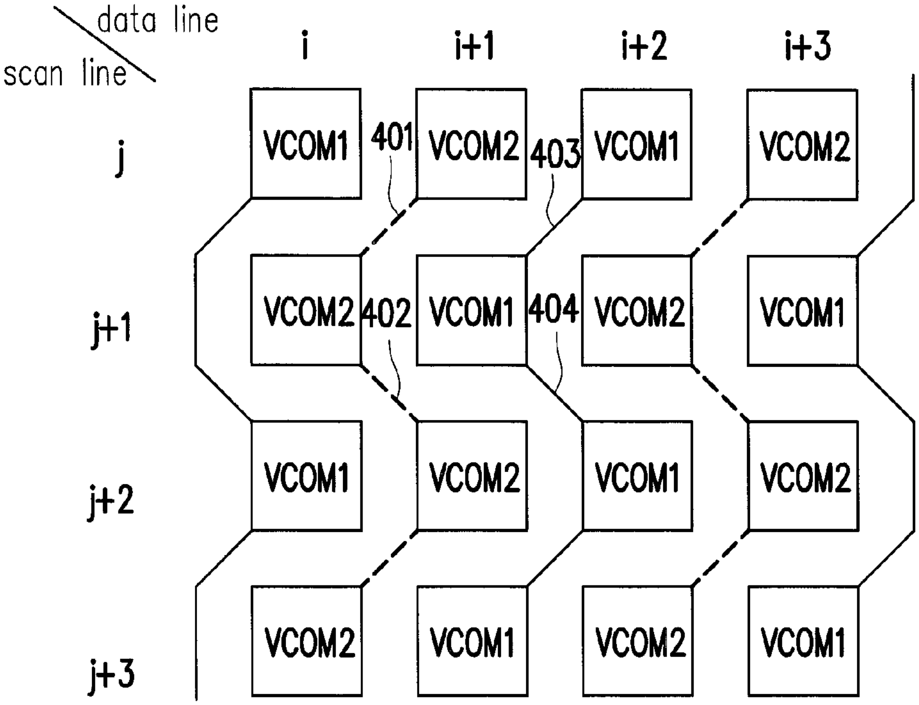

Referring to FIG. 4, in the exemplary embodiment of FIG. 4, the pixels are also coupled to the first common electrodes or the second common electrodes in form of the serration along longitudinal direction. More specifically, the pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i, j+1) located on a $i^{th}$ data line and a $(j+1)^{th}$ scan line through a wire 401. The second common electrode of the pixel p(i, j+1) located on the $i^{th}$ data line and the $(j+1)^{th}$ scan line is coupled to the second common electrode of the pixel p(i+1, j+2) located on the $(i+1)^{th}$ data line and the $(j+2)^{th}$ scan line through a wire 402. The pixel p(i+2, j) located on the $(i+2)^{th}$ data line and the $j^{th}$ scan line is coupled to the first common electrode, and the first common electrode of the pixel p(i+1, j+1) is coupled to the pixel located on the $(i+1)^{th}$ data line and the $(j+1)^{th}$ scan line through a wire 403. The first common electrode of the pixel p(i+1, j+1) is coupled to the first common electrode of the pixel p(i+2, j+2) located on the $(i+2)^{th}$ data line and the $(j+2)^{th}$ scan line through a wire 404. The rest of the coupling relations are as illustrated in the figure, thus related description is omitted hereinafter.

Figure 5:
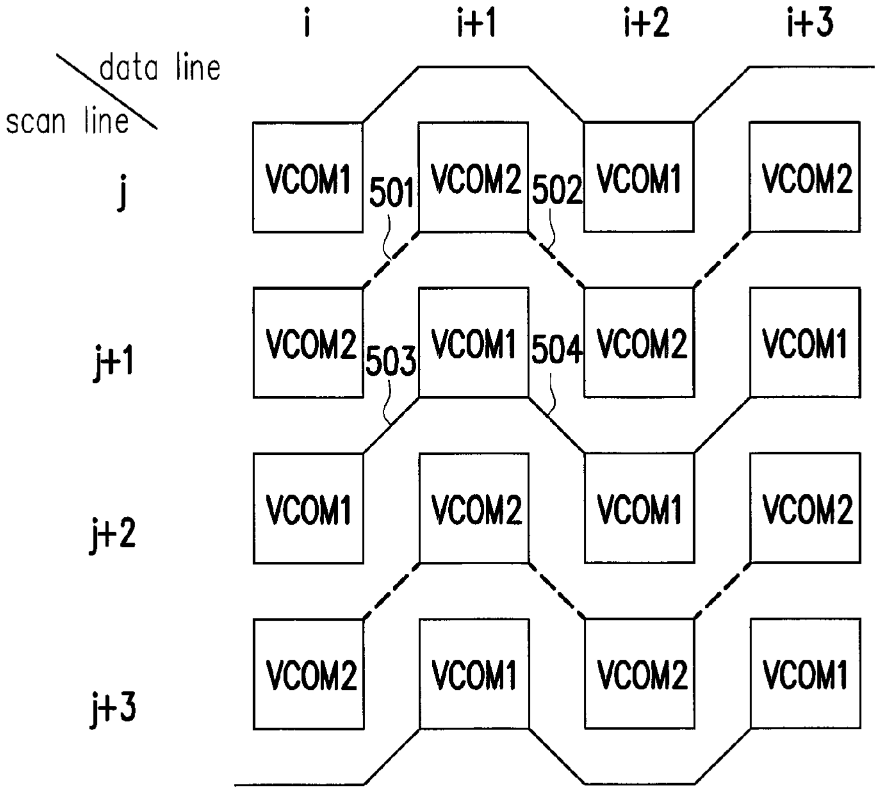

Referring to FIG. 5, in the exemplary embodiment of FIG. 5, the pixels are coupled to the first common electrodes or the second common electrodes in form of a serration along transverse direction. More specifically, the pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i+1, j) located on the $(i+1)^{th}$ data line and the $j^{th}$ scan line through a wire 501. The second common electrode of the pixel p(i+1, j) is coupled to the second common electrode of the pixel p(i+2, j+1) located on the $(i+2)^{th}$ data line and the $(j+1)^{th}$ scan line through a wire 502. The pixel p(i, j+2) located on the $i^{th}$ data line and the $(j+2)^{th}$ scan line is coupled to the first common electrode, and the first common electrode of the pixel p(i, j+2) is coupled to the first common electrode of the pixel p(i+1, j+1) located on the $(i+1)^{th}$ data line and the $(j+1)^{th}$ scan line through a wire 503. The first common electrode of the pixel p(i+1, j+1) is coupled to the first common electrode of the pixel p(i, j+2) located on the $(i+2)^{th}$ data line and the $(j+2)^{th}$ scan line through a wire 504. The rest of the coupling relations are as illustrated in the figure, thus related description is omitted hereinafter.

Figure 6:
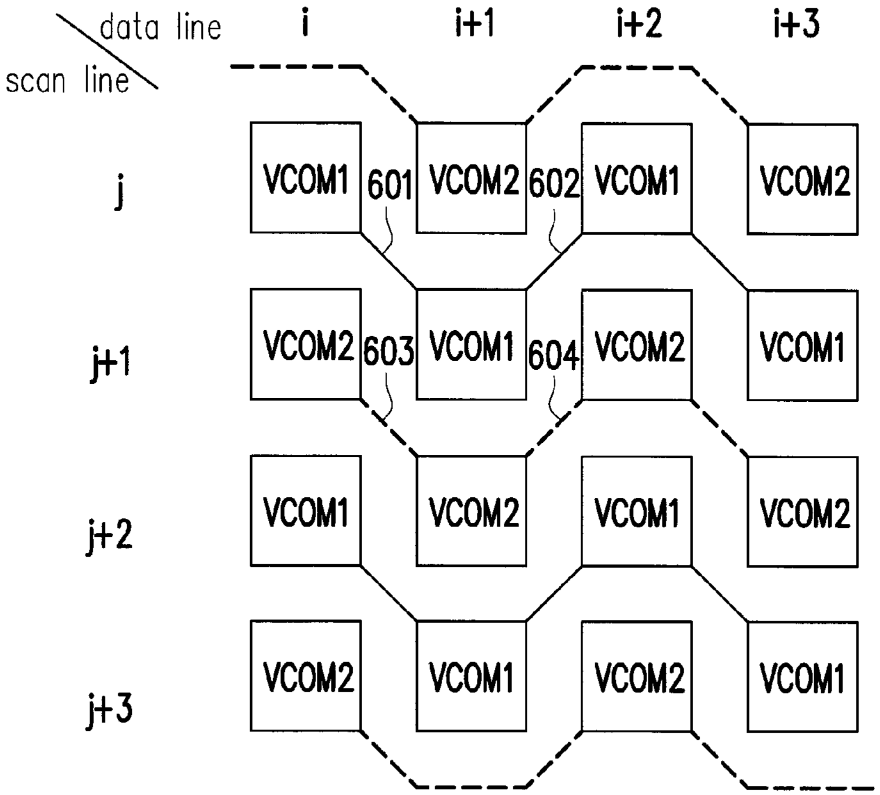

Referring to FIG. 6, in the exemplary embodiment of FIG. 6, the pixels are also coupled to the first common electrodes or the second common electrodes in form of the serration along transverse direction. More specifically, the pixel p(i, j) located on the $i^{th}$ data line and the $j^{th}$ scan line is coupled to the first common electrode, and the first common electrode of the pixel p(i, j) is coupled to the first common electrode of the pixel p(i+1, j+1) located on the $(i+1)^{th}$ data line and the $(j+1)^{th}$ scan line through a wire 601. The first common electrode of the pixel p(i+1, j+1) is coupled to the first common electrode of the pixel p(i+2, j) located on the $(i+2)^{th}$ data line and the $j^{th}$ scan line through a wire 602. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i+1, j+2) located on the $(i+1)^{th}$ data line and the $(j+2)^{th}$ scan line through a wire 603. The second common electrode of the pixel p(i+1, j+2) is coupled to the second common electrode of the pixel p(i+2, j+1) located on the $(i+2)^{th}$ data line and the $(j+1)^{th}$ scan line through a wire 604. The rest of the coupling relations are as illustrated in the figure, thus related description is omitted hereinafter.

Figure 7:
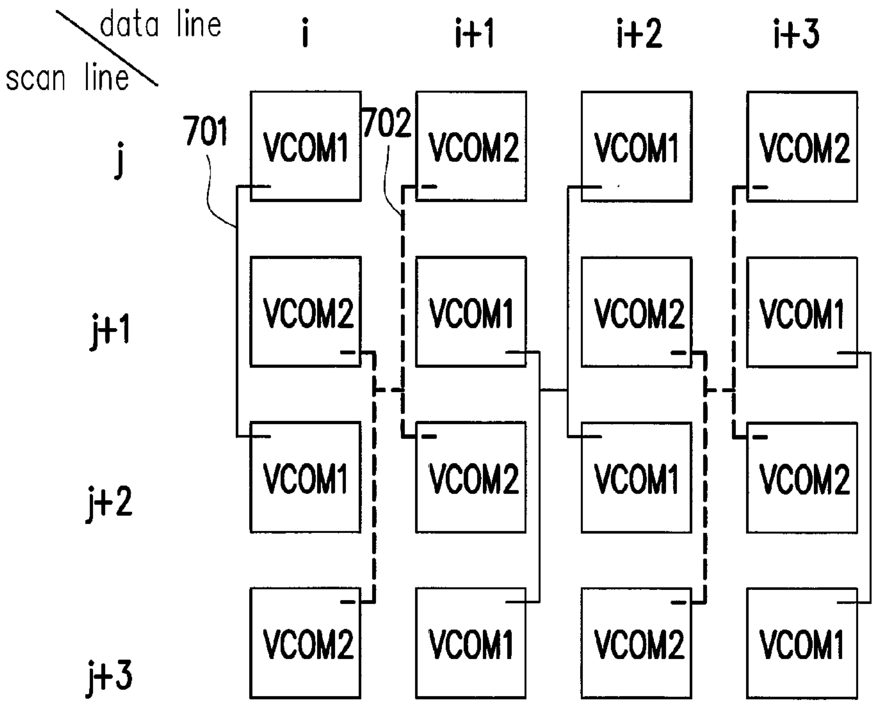

Referring to FIG. 7, in the exemplary embodiment of FIG. 7, the pixels on the adjacent data lines are coupled to each other though one wire. More specifically, the pixel p(i, j) located on the $i^{th}$ data line and the $j^{th}$ scan line is coupled to the first common electrode, and the first common electrode of the pixel p(i, j) is coupled to the first common electrode of the pixel p(i, j+2) located on the $i^{th}$ data line and the $(j+2)^{th}$ scan line through a wire 701. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i, j+3) located on the $i^{th}$ data line and a $(j+3)^{th}$ scan line, the second common electrode of the pixel p(i+1, j) located on the $(i+1)^{th}$ data line and the $j^{th}$ scan line, and the second common electrode of the pixel p(i+1, j+2) located on the $(i+1)^{th}$ data line and the $(j+2)^{th}$ scan line through a wire 702. The rest of the coupling relations are as illustrated in the figure, thus related description is omitted hereinafter.

Figure 8:
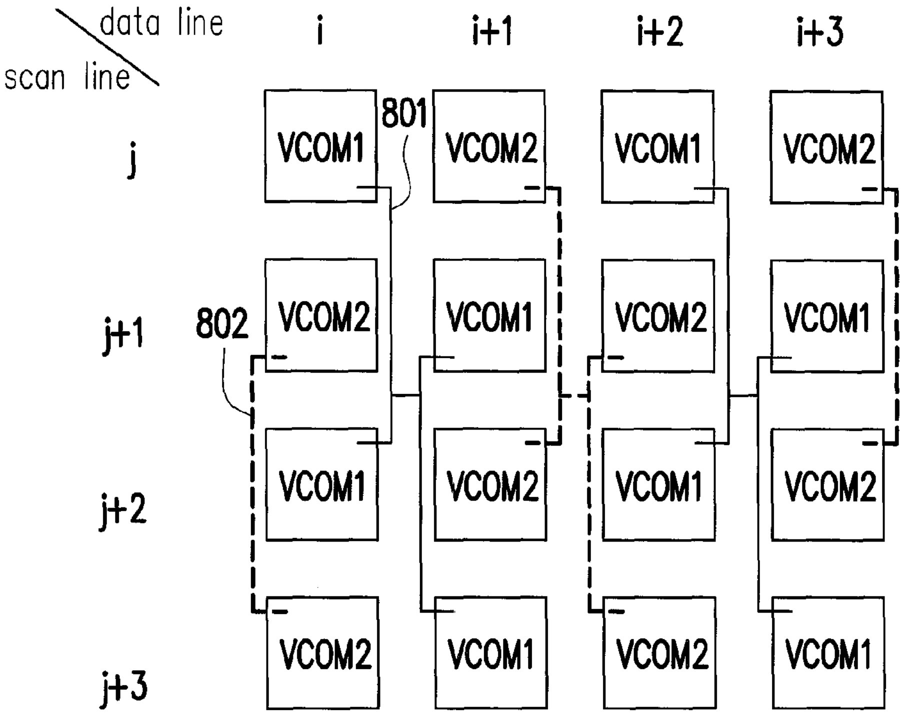

Referring to FIG. 8, in the exemplary embodiment of FIG. 8, the pixel p(i, j) located on the $i^{th}$ data line and the $j^{th}$ scan line is coupled to the first common electrode, and the first common electrode of the pixel p(i, j) is coupled to the first common electrode of the pixel p(i, j+2) located on the $i^{th}$ data line and the $(j+2)^{th}$ scan line, the first common electrode of the pixel p(i+1, j+1) located on the $(i+1)^{th}$ data line and the $(j+1)^{th}$ scan line, and the first common electrode of the pixel p(i+1, j+3) located on the $(i+1)^{th}$ data line and the $(j+3)^{th}$ scan line through a wire 801. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i, j+3) located on the $i^{th}$ data line and the $(j+3)^{th}$ scan line through a wire 802. The rest of the coupling relations are as illustrated in the figure, thus related description is omitted hereinafter.

Figure 9:
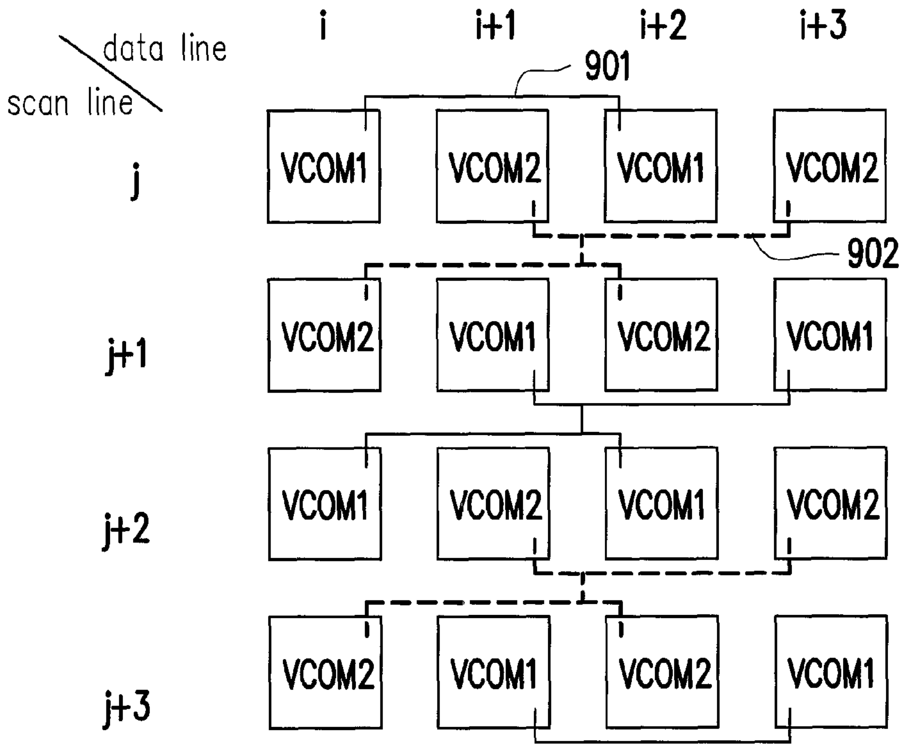

Referring to FIG. 9, in the exemplary embodiment of FIG. 9, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line through a wire 901. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+3, j) located on the $(i+3)^{th}$ data line and the $j^{th}$ scan line, the second common electrode of the pixel p(i, j+1) located on the $i^{th}$ data line and the $(j+1)^{th}$ scan line, and the second common electrode of the pixel p(i+2, j+1) located on the $(i+2)^{th}$ data line and the $(j+1)^{th}$ scan line through a wire 902. The rest of the coupling relations are as illustrated in the figure, thus related description is omitted hereinafter.

Figure 10:
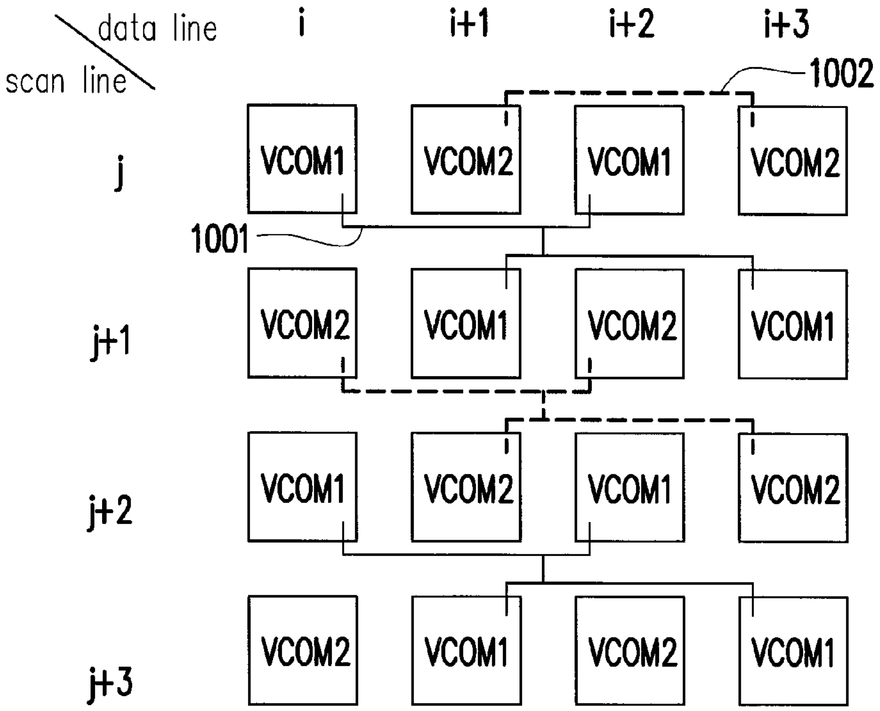

Referring to FIG. 10, in the exemplary embodiment of FIG. 10, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line, the first common electrode of the pixel p(i+1, j+1) located on the $(i+1)^{th}$ data line and the $(j+1)^{th}$ scan line, and the first common electrode of the pixel p(i+3, j+1) located on the $(i+3)^{th}$ data line and the $(j+1)^{th}$ scan line through a wire 1001. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+3, j) located on the $(i+3)^{th}$ data line and the $j^{th}$ scan line through a wire 1002. The rest of the coupling relations are as illustrated in the figure, thus related description is omitted hereinafter.

Figure 11:
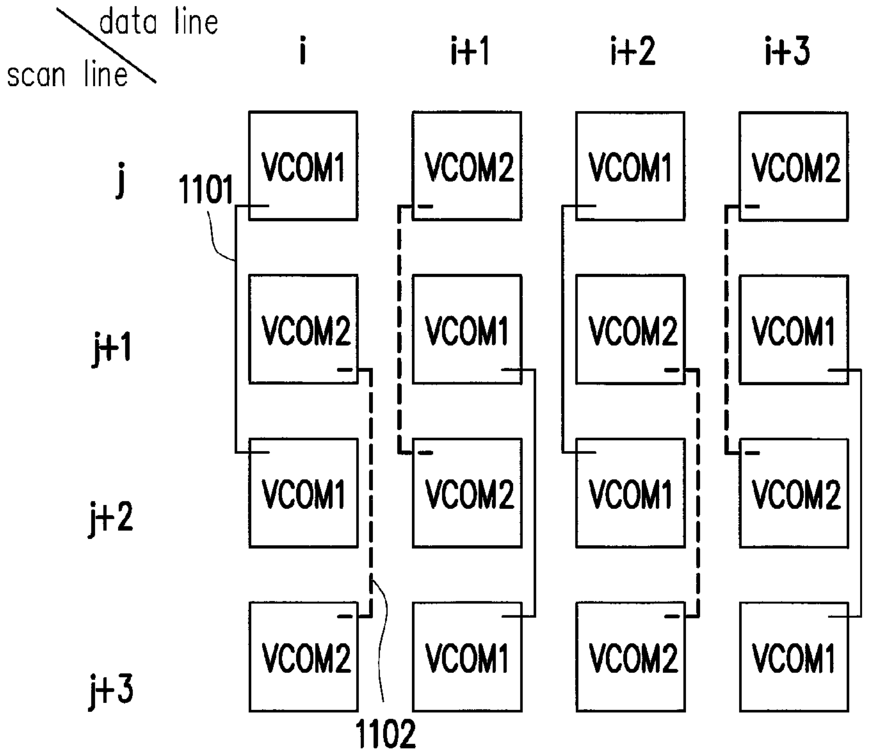
Figure 12:
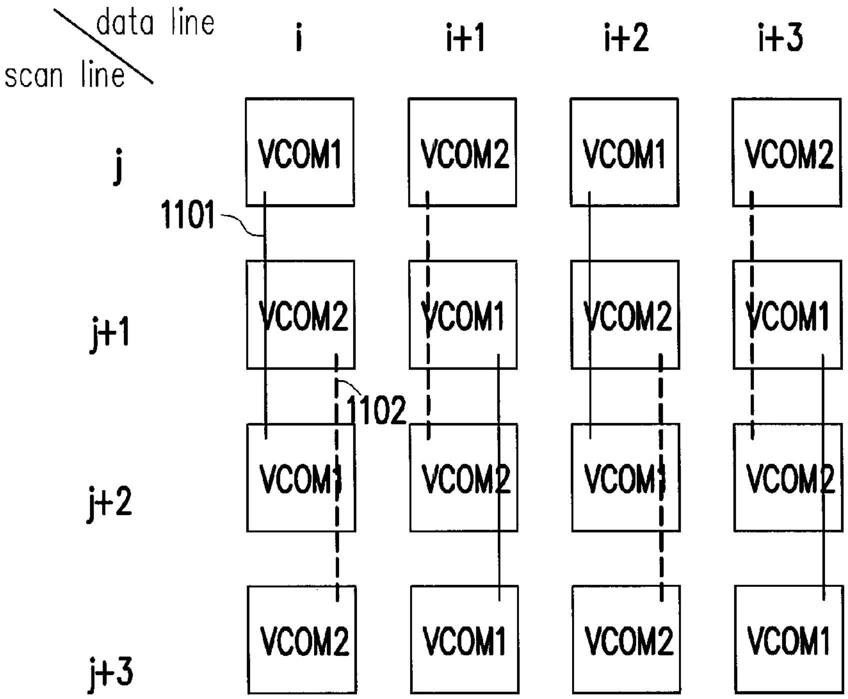

Referring to FIG. 11, in the exemplary embodiment of FIG. 11, the pixel p(i, j) located on the $i^{th}$ data line and the $j^{th}$ scan line is coupled to the first common electrode, and the first common electrode of the pixel p(i, j) is coupled to the first common electrode of the pixel p(i, j+2) located on the $i^{th}$ data line and the $(j+2)^{th}$ scan line through a wire 1101. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i, j+3) located on the $i^{th}$ data line and the $(j+3)^{th}$ scan line through a wire 1102. Referring to FIG. 12, FIG. 12 is similar to FIG. 11, but including a wire 1011 that crosses over the pixel p(i, j+1) located on the $i^{th}$ data line and the $(j+1)^{th}$ scan line, and a wire 1102 that crosses over the pixel p(i, j+2) located on the $i^{th}$ data line and the $(j+2)^{th}$ scan line. In an exemplary embodiment, the wires 1101 and 1102 are disposed on the same metal layer where the data lines X1 to X3 are located, but the invention is not limited thereto.

Figure 13:
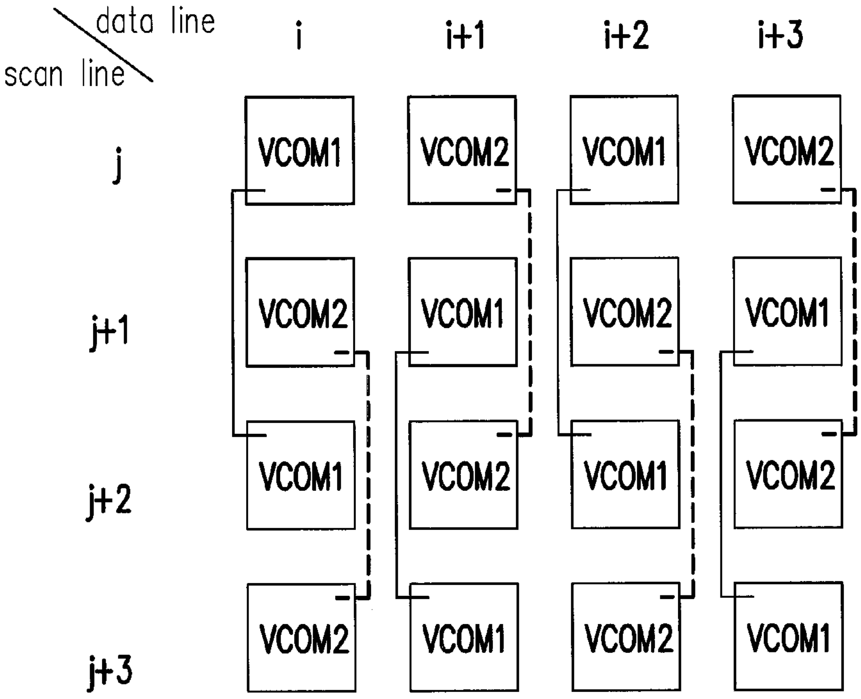
Figure 14:
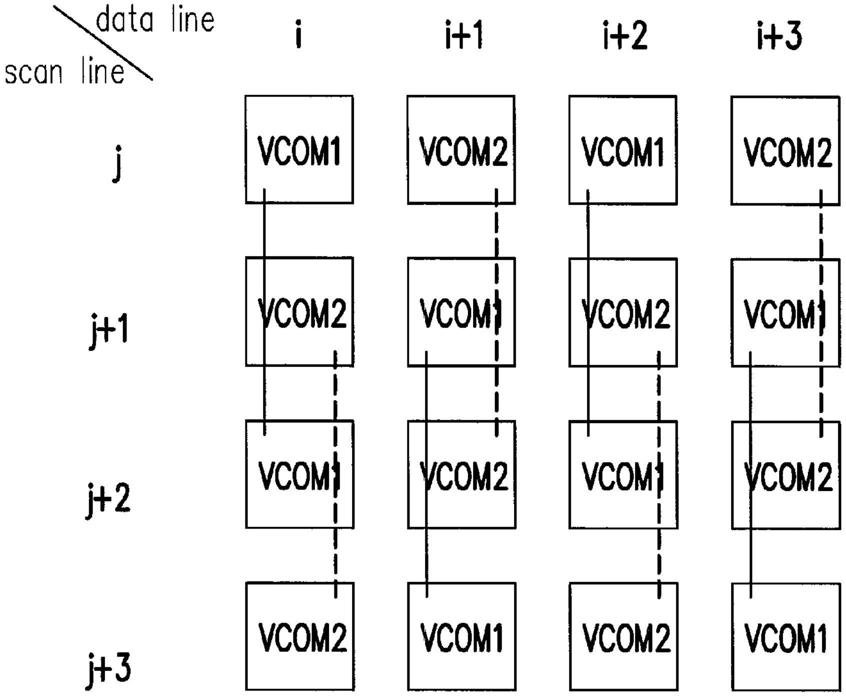

Referring to FIG. 13 and FIG. 14, FIG. 13 is similar to FIG. 11, FIG. 14 is similar to FIG. 12, and only positions of the wires are disposed slightly different from each other in said figures.

Figure 15:
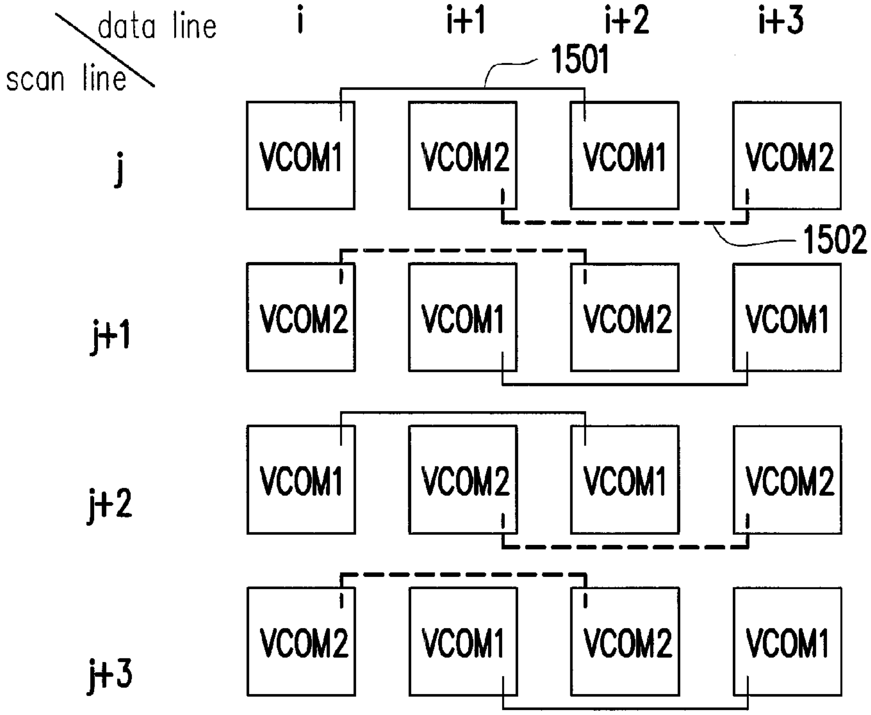
Figure 16:
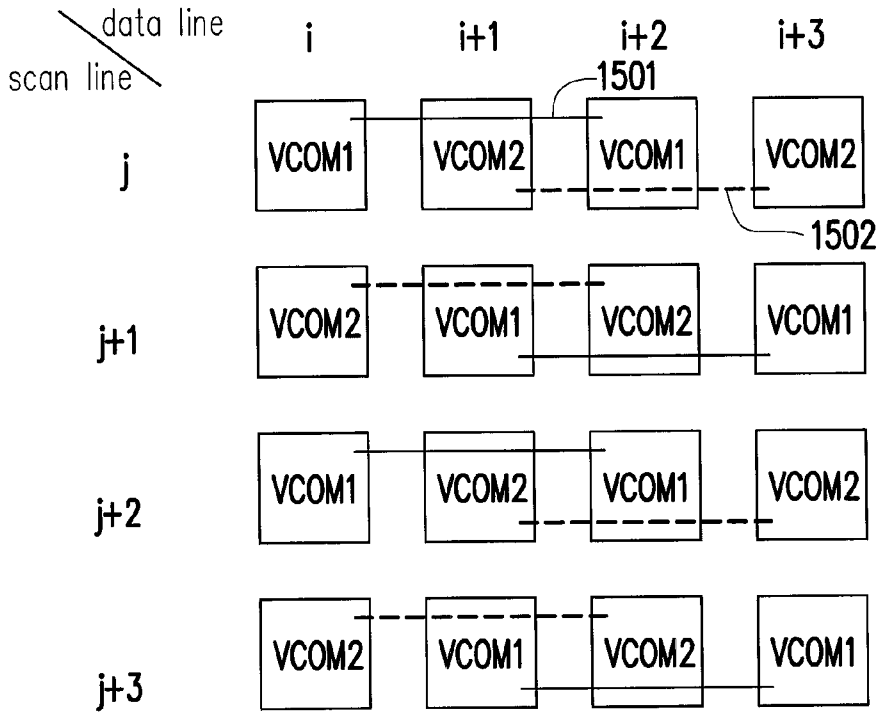

Referring to FIG. 15, in the exemplary embodiment of FIG. 15, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line through a wire 1501. The pixel p(i+1, j) located on the $(i+11)^{th}$ data line and the $j^{th}$ scan line is coupled to the second common electrode, and the second common electrode of the pixel p(i+1, j) is coupled to the second common electrode of the pixel p(i+3, j) located on the $(i+3)^{th}$ data line and the $j^{th}$ scan line through a wire 1502. Referring to FIG. 16, FIG. 16 is similar to FIG. 15, but including a wire 1501 that crosses over the pixel p(i+1, j) located on the $(i+1)^{th}$ data line and the $j^{th}$ scan line, and a wire 1502 that crosses over the pixel p(i+2, j) located on the $(i+2)^{th}$ data line and the $j^{th}$ scan line. In an exemplary embodiment, the wires 1501 and 1502 are disposed on the same metal layer where the scan lines Y1 to Y3 are located, but the invention is not limited thereto.

Figure 17:
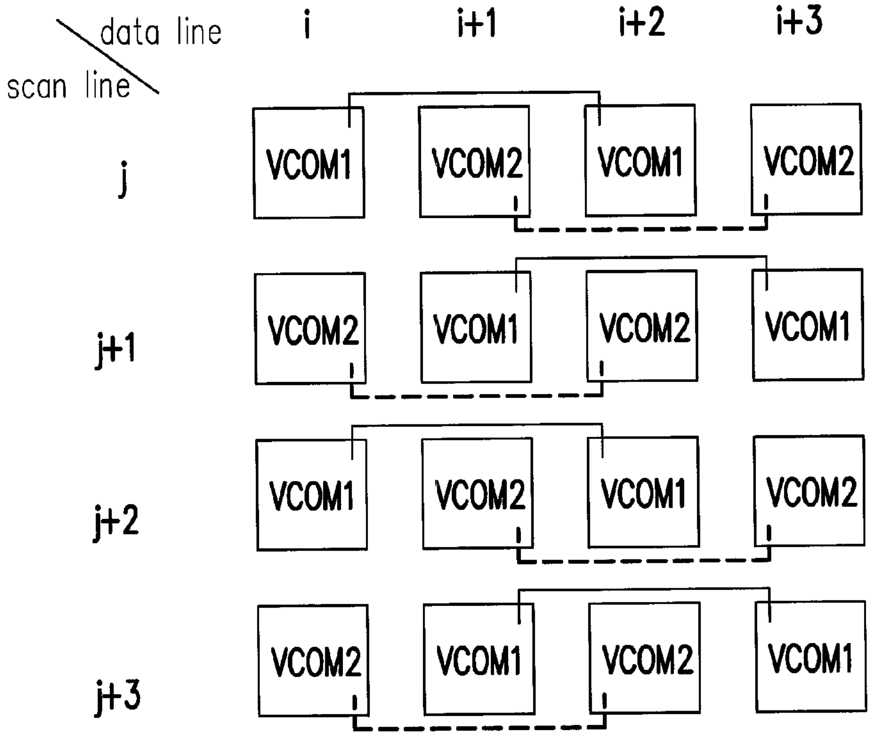
Figure 18:
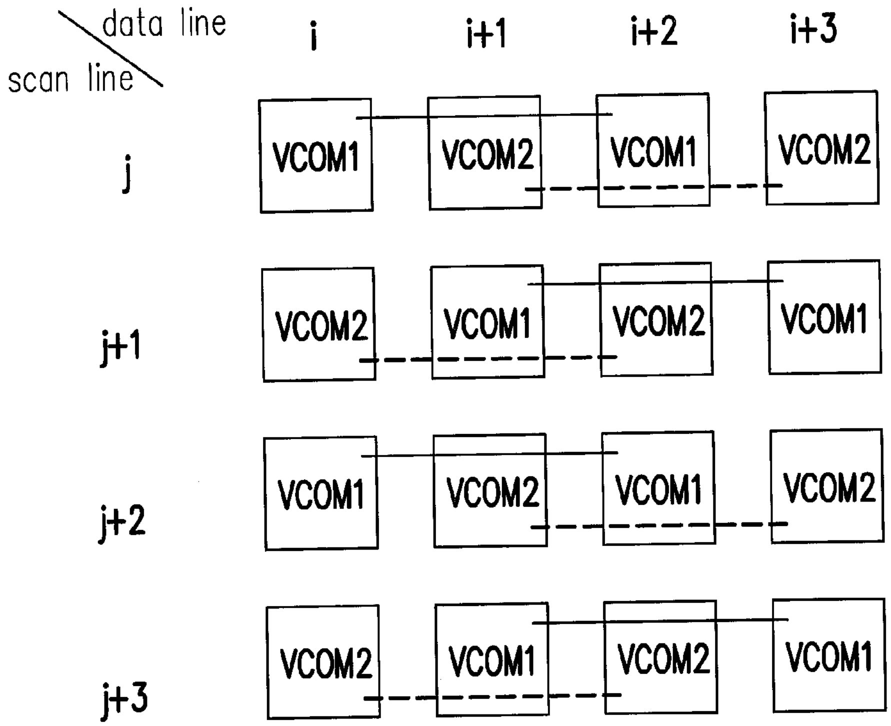

Referring to FIG. 17 and FIG. 18, FIG. 17 is similar to FIG. 15, FIG. 18 is similar to FIG. 16, and only positions of the wires are disposed slightly different from each other in said figures.

Figure 19:
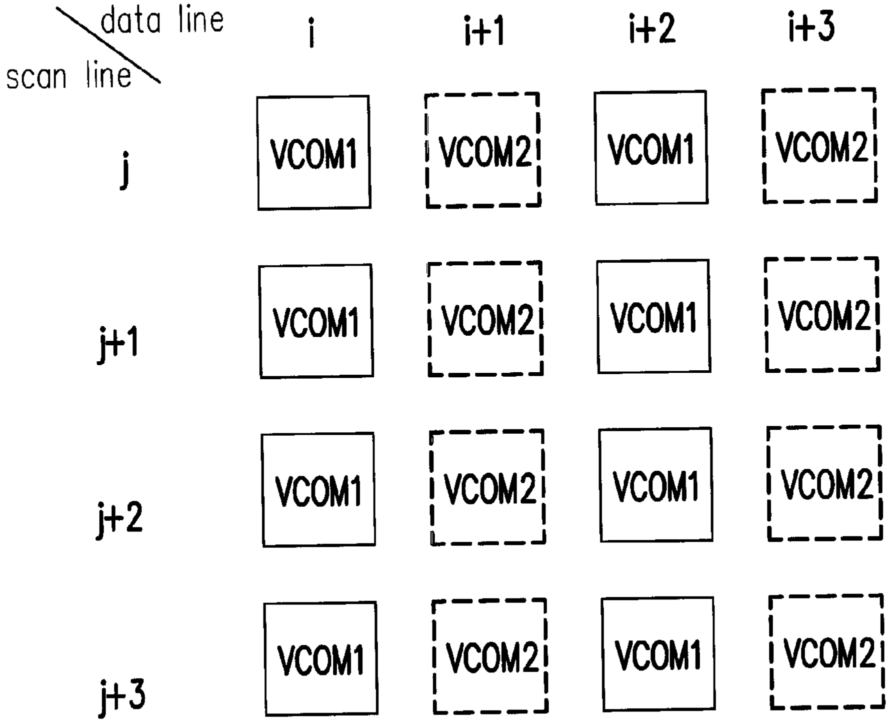

Referring to FIG. 19, in the exemplary embodiment of FIG. 19, the pixels located on the same data line are all coupled to the first common electrodes or the second common electrodes. For instance, the pixels located on the $i^{th}$ data line are all coupled to the first common electrodes, and the pixel located on the $(i+1)^{th}$ data line are all coupled to the second common electrodes. However, disposition of the wires depicted in FIG. 19 is not particularly limited in the invention.

Figure 20:
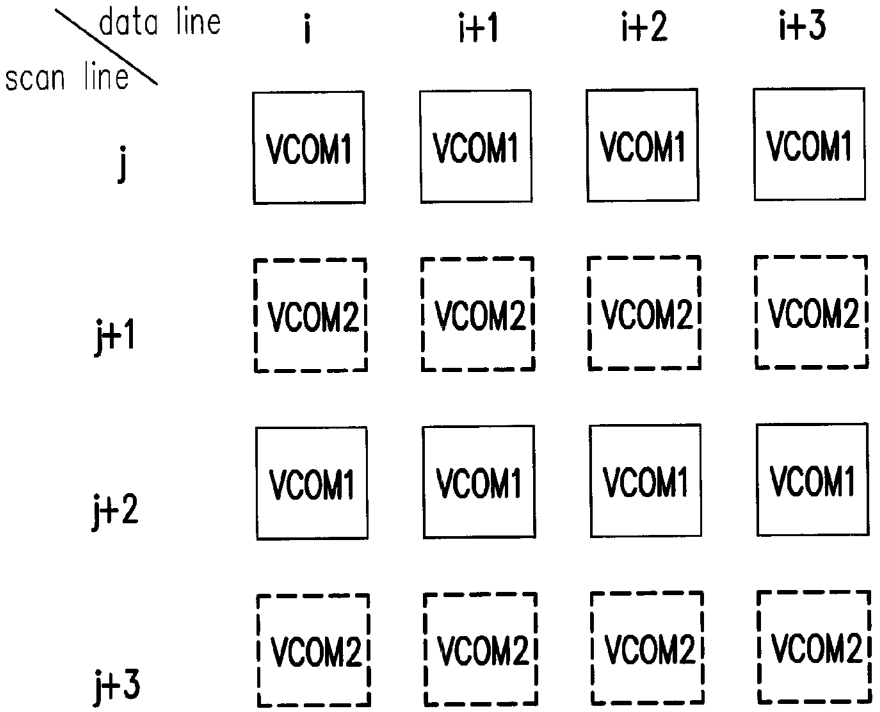

Referring to FIG. 20, in the exemplary embodiment of FIG. 20, the pixels located on the same scan line are all coupled to the first common electrodes or the second common electrodes. For instance, the pixels located on the $j^{th}$ scan line are all coupled to the first common electrodes, and the pixel located on the $(j+1)^{th}$ scan line are all coupled to the second common electrodes. However, disposition of the wires depicted in FIG. 20 is not particularly limited in the invention.

Figure 21:
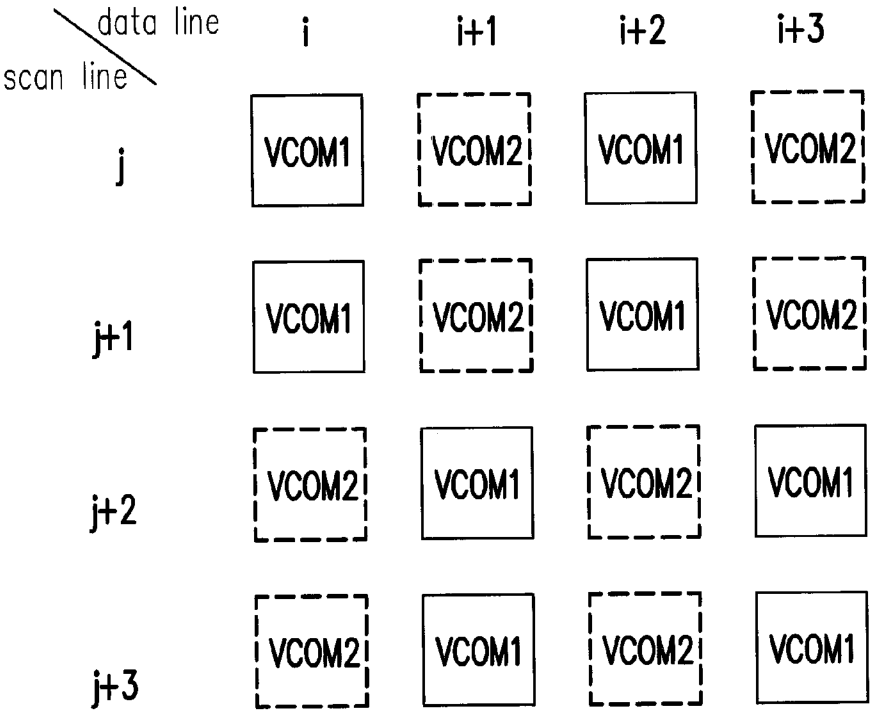

Referring to FIG. 21, in the exemplary embodiment of FIG. 21, each two adjacent pixels on the data line are coupled to the same common electrodes. For instance, the pixel p(i, j) located on the $i^{th}$ data line and the $j^{th}$ scan line and the pixel located p(i, j+1) on the $i^{th}$ data line and the $(j+1)^{th}$ scan line are coupled to the first common electrodes. The pixel p(i+1, j) located on the $(i+1)^{th}$ data line and the $j^{th}$ scan line and the pixel p(i+1, j+1) located on the $(i+1)^{th}$ data line and the $(j+1)^{th}$ scan line are coupled to the second common electrodes. However, disposition of the wires depicted in FIG. 21 is not particularly limited in the invention.

Figure 22:
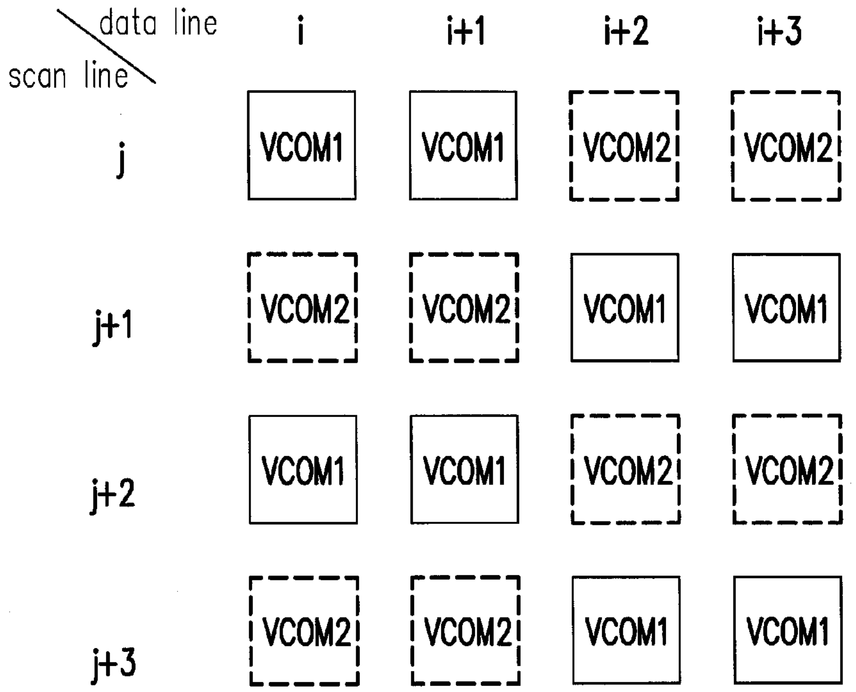
Figure 23:
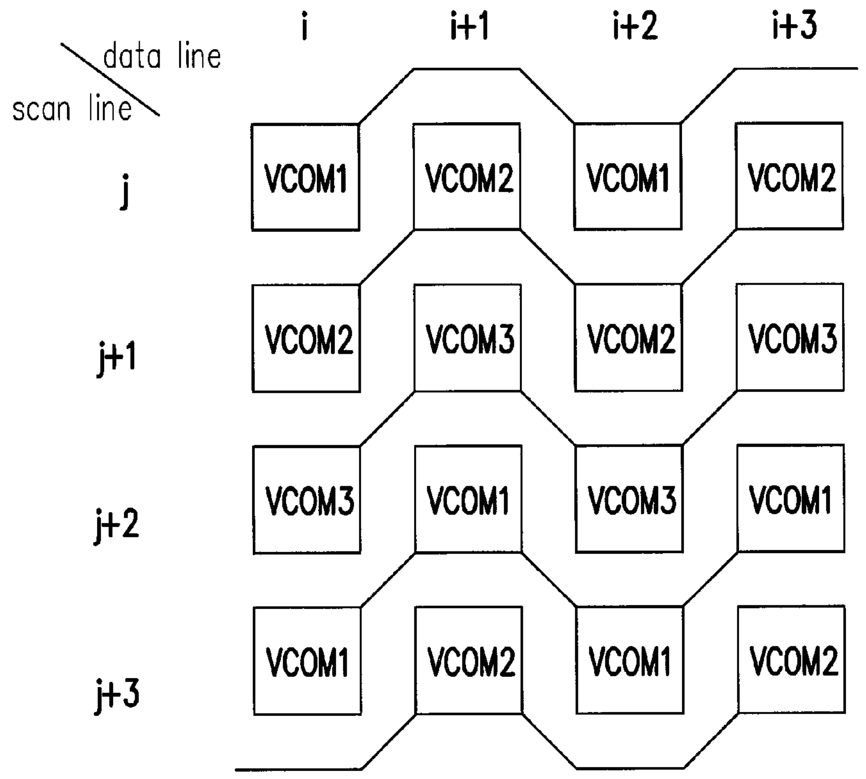
Figure 24:
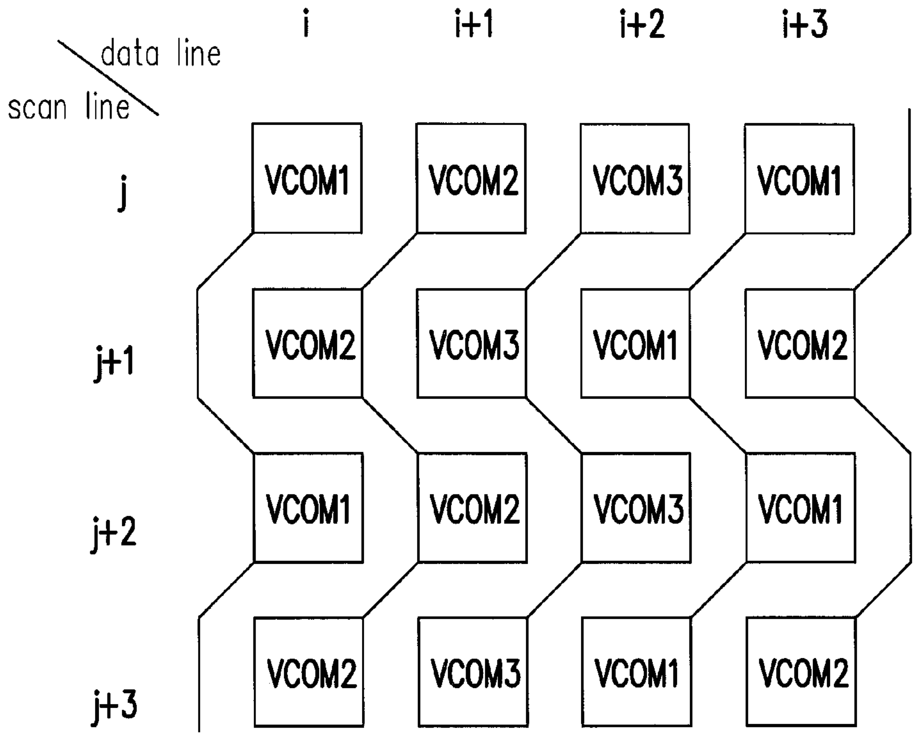
Figure 25:
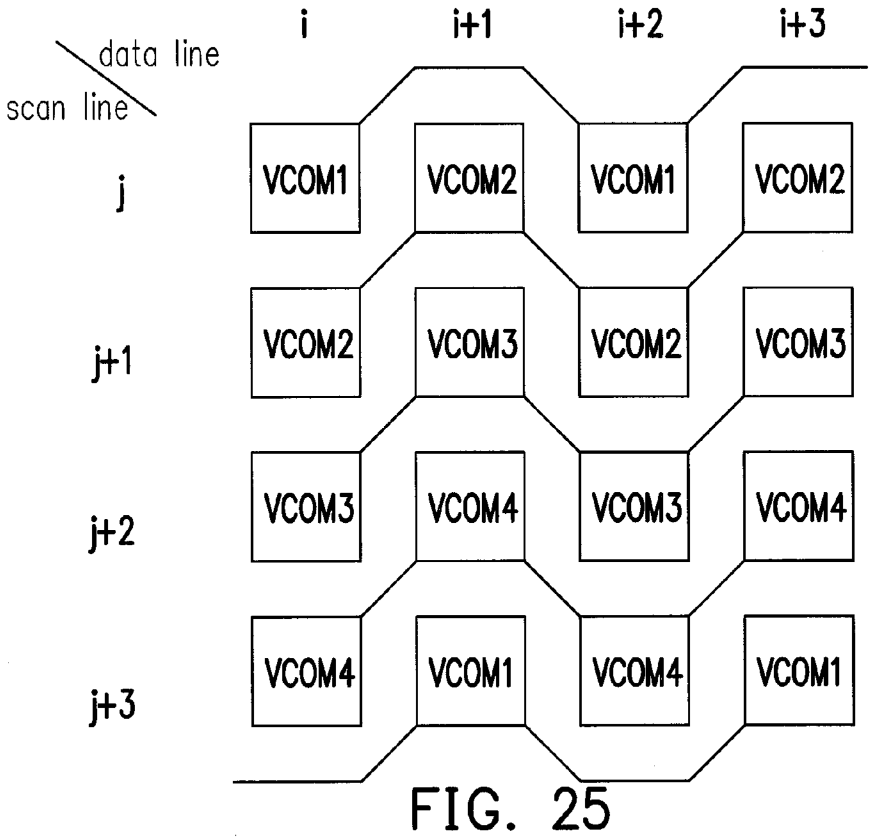
Figure 26:
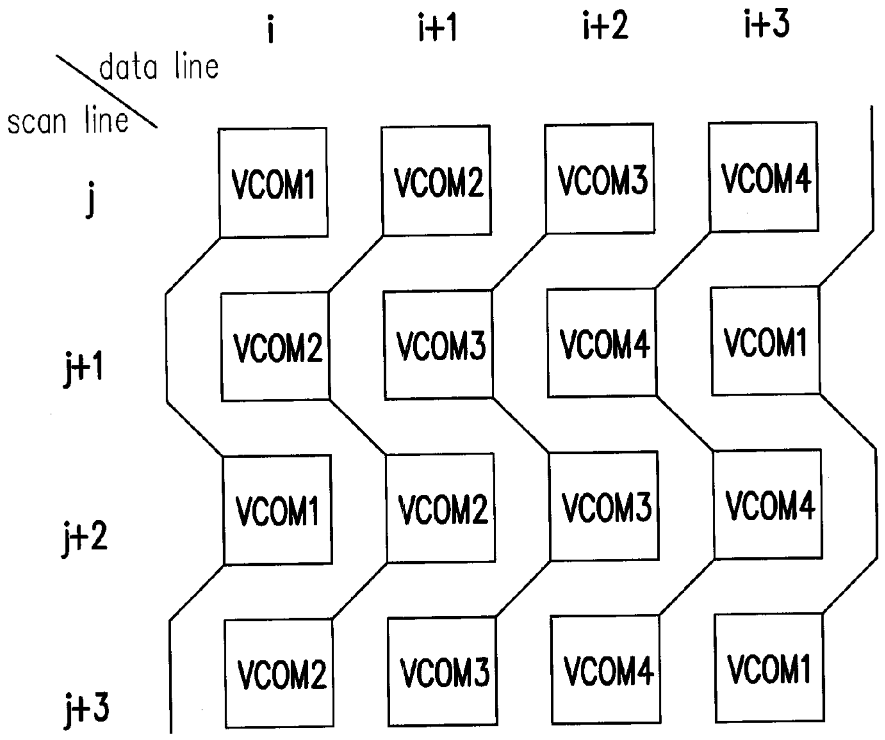
Figure 27:
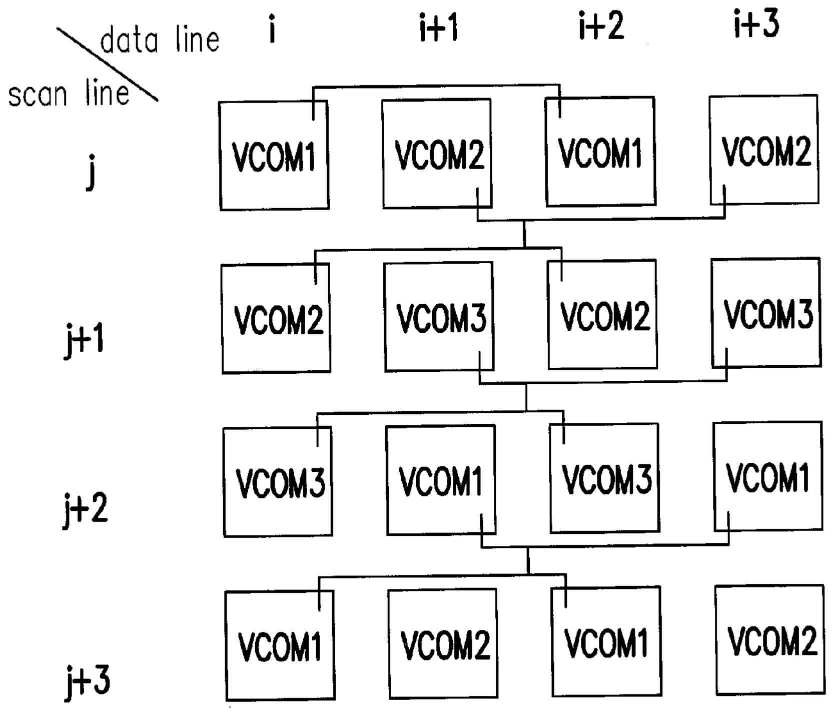
Figure 28:
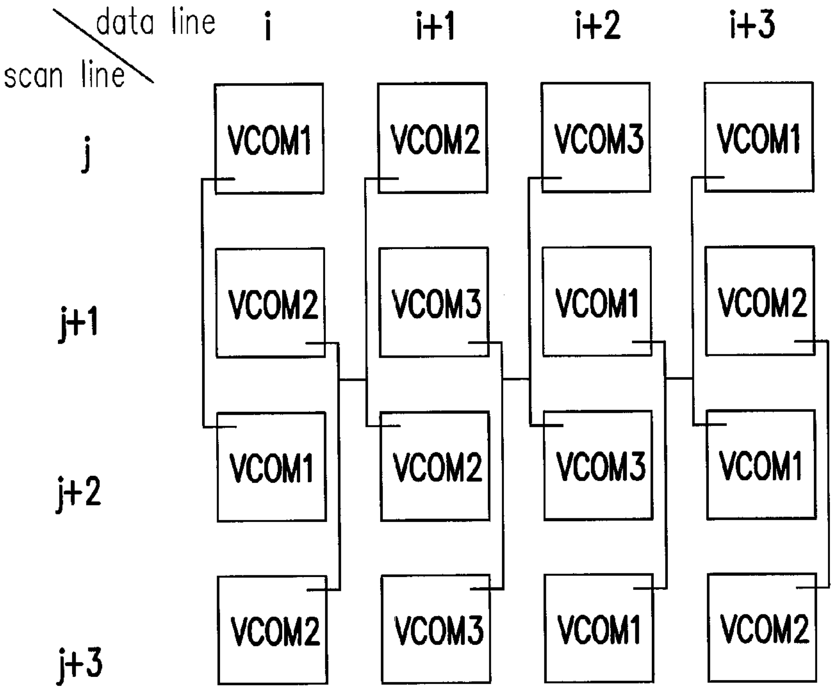
Figure 29:
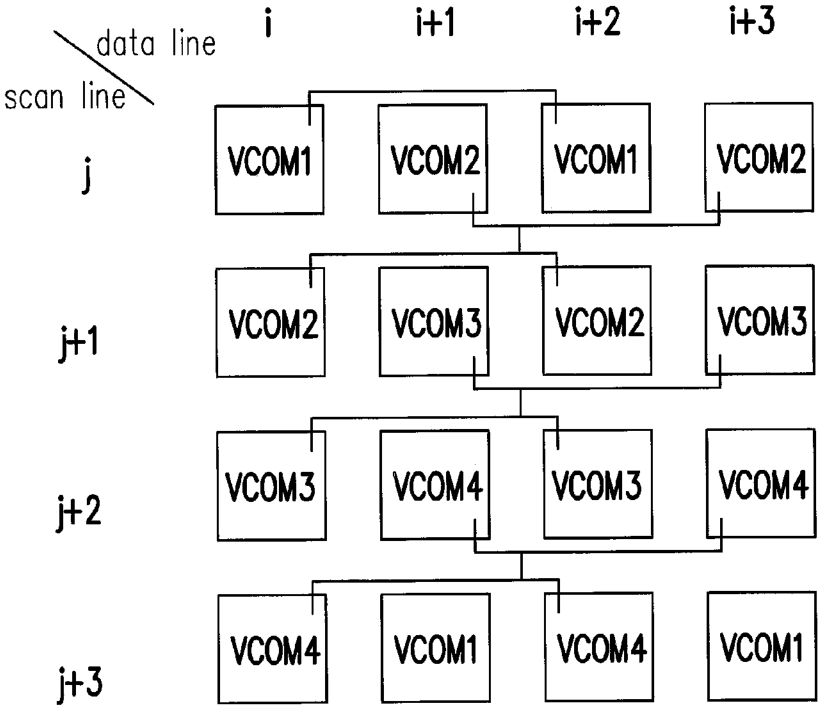
Figure 30:
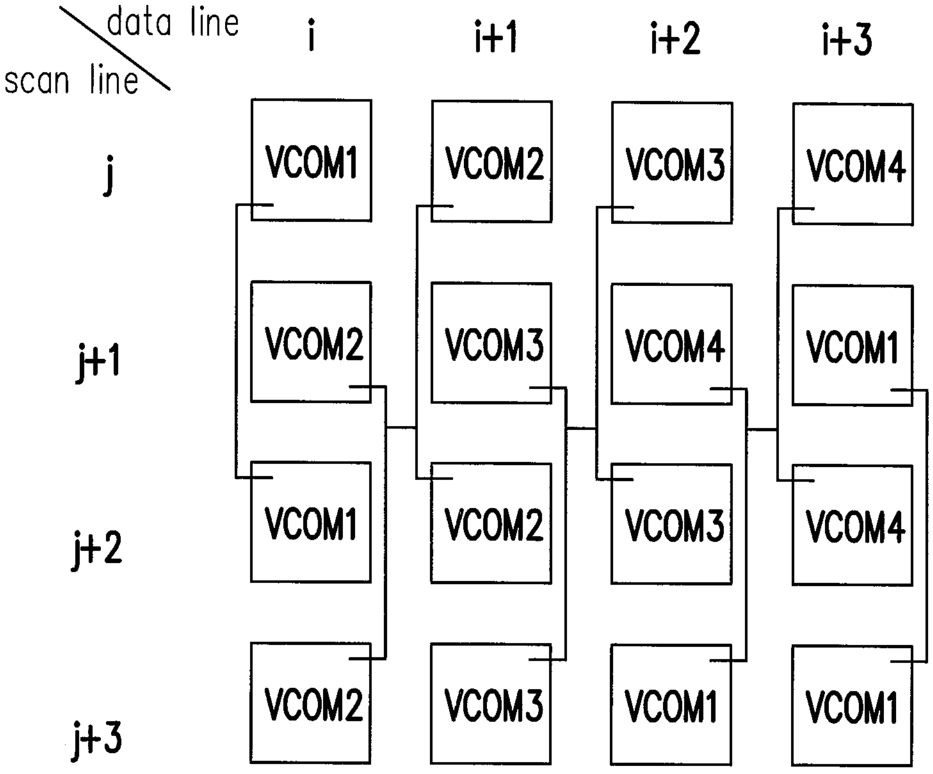

Referring to FIG. 22, in the exemplary embodiment of FIG. 22, each two adjacent pixels on the scan line are coupled to the same common electrodes. For instance, the pixel p(i, j) located on the $i^{th}$ data line and the $j^{th}$ scan line and the pixel p(i+1, j) located on the $(i+1)^{th}$ data line and the $j^{th}$ scan line are coupled to the first common electrodes. The pixel p(i, j+1) located on the $i^{th}$ data line and the $(j+1)^{th}$ scan line and the pixel p(i+1, j+1) located on the $(i+1)^{th}$ data line and the $(j+1)^{th}$ scan line are coupled to the second common electrodes. However, disposition of the wires depicted in FIG. 22 is not particularly limited in the invention.

In the foregoing exemplary embodiments depicted in FIG. 2 through FIG. 22, the liquid crystal display panel 110 includes two common electrodes which are electrically independent from each other. However, in exemplary embodiments depicted in FIG. 23 through FIG. 30, the liquid crystal display panel 110 includes three or four common electrodes. "VCOM3" marked in one pixel indicates that the corresponding pixel is coupled to a third common electrode, whereas "VCOM4" indicates that the corresponding pixel is coupled to a fourth common electrode. However, in other exemplary embodiments, the liquid crystal display panel 110 may also include more common electrodes. In the invention, an amount of the common electrodes are not limited, and a coupling relation between the pixels and the common electrodes are not limited either. The coupling relation between the pixels and the common electrodes as depicted in FIG. 23 through FIG. 30 are similar to that described in the foregoing exemplary embodiments, thus related descriptions are omitted hereinafter.

In summary, in the exemplary embodiments of the invention, the liquid crystal display panel including more than two common electrodes which are electrically independent from each other is provided. Accordingly, usage or operation of the liquid crystal display panel is more flexible.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display panel, comprising:

a plurality of first common electrodes;

a plurality of second common electrodes, wherein the second common electrodes and the first common electrodes are electrically independent from each other; and a plurality of pixels, wherein a plurality of first pixels of the pixels are coupled to the first common electrodes, each of the first pixels is coupled to a corresponding one of the first common electrodes, a plurality of second pixels of the pixels are coupled to the second common electrodes, and each of the second pixels is coupled to a corresponding one of the second common electrodes, wherein the first common electrode of a pixel located on a ith data line and a jth scan line is directly coupled to the first common electrode of a pixel located on a (i+1)th data line and a (j+1)th scan line through a first wire, and the first common electrode of the pixel located on the (i+1)th data line and the (j+1)th scan line is directly coupled to the first common electrode of a pixel located on the ith data line and a (j+2)th scan line through a second wire, wherein the first wire is distinct from the second wire, and i and j are positive integers.

2. The liquid crystal display panel of claim 1, further comprising:

a plurality of data lines comprising the ith data line and the (i+1)th data line; and a plurality of scan lines comprising the jth scan line, the (j+1)th scan line and the (j+2)th scan line, wherein each of the pixels comprises:

a switch element;

a pixel capacitor coupled to the first common electrode or the second common electrode; and a storage capacitor coupled to the first common electrode or the second common electrode.

3. The liquid crystal display panel of claim 1, wherein wherein the second common electrode of a pixel located on the (i+1)th data line and the jth scan line is coupled to the second common electrode of a pixel located on the (i)th data line and the (j+1)th scan line through a third wire, the second common electrode of the pixel located on the (i)th data line and the (j+1)th scan line is coupled to the second common electrode of a pixel located on a (i+1)th data line and the (j+2)th scan line through a fourth wire.

4. The liquid crystal display panel of claim 1, wherein wherein the second common electrode of a pixel located on the (i+1)th data line and the jth scan line is coupled to the second common electrode of a pixel located on a (i+2)th data line and the (j+1)th scan line through a third wire, and the second common electrode of the pixel located on the (i+2)th data line and the (j+1)th scan line is coupled to the second common electrode of a pixel located on the (i+1)th data line and the (j+2)th scan line through a fourth wire.

5. A display device, comprising:

a data driver coupled to a plurality of data lines comprising a ith data line and a (i+1)th data line;

a scan driver coupled to a plurality of scan lines comprising a jth scan line, a (j+1)th scan line and a (j+2)th scan line;

a liquid crystal display panel coupled to the data lines and the scan lines, wherein the liquid crystal display panel comprises:

a plurality of first common electrodes;

a plurality of second common electrodes, wherein the second common electrodes and the first common electrodes are electrically independent from each other; and a plurality of pixels, wherein a plurality of first pixels of the pixels are coupled to the first common electrodes, each of the first pixels is coupled to a corresponding one of the first common electrodes, a plurality of second pixels of the pixels are coupled to the second common electrodes, and each of the second pixels is coupled to a corresponding one of the second common electrodes, wherein the first common electrode of a pixel located on the ith data line and the jth scan line is directly coupled to the first common electrode of a pixel located on the (i+1)th data line and the (j+1)th scan line through a first wire, and the first common electrode located of the pixel on the (i+1)th data line and the (j+1)th scan line is directly coupled to the first common electrode of a pixel located on the ith data line and the (j+2)th scan line through a second wire, wherein the first wire is distinct from the second wire, and i and j are positive integers.

6. The display device of claim 5, further comprising:

a plurality of data lines comprising the ith data line and the (i+1)th data line; and a plurality of scan lines comprising the jth scan line, the (j+1)th scan line and the (j+2)th scan line, wherein each of the pixels comprises:

a switch element;

a pixel capacitor coupled to the first common electrode or the second common electrode; and a storage capacitor coupled to the first common electrode or the second common electrode.

7. The display device of claim 5, wherein the second common electrode located on the (i+1)th data line and the jth scan line is coupled to the second common electrode of a pixel located on the (i)th data line and the (j+1)th scan line through a third wire, the second common electrode of the pixel located on the (i)th data line and the (j+1)th scan line is coupled to the second common electrode of a pixel located on a (i+1)th data line and the (j+2)th scan line through a fourth wire.

8. The display device of claim 5, wherein the second common electrode of a pixel located on the (i+1)th data line and the jth scan line is coupled to the second common electrode of a pixel located on a (i+2)th data line and the (j+1)th scan line through a third wire, and the second common electrode of the pixel located on the (i+2)th data line and the (j+1)th scan line is coupled to the second common electrode of a pixel located on the (i+1)th data line and the (j+2)th scan line through a fourth wire.

9. A liquid crystal display panel, comprising:

a plurality of first common electrodes;

a plurality of second common electrodes, wherein the second common electrodes and the first common electrodes are electrically independent from each other; and a plurality of pixels, wherein a plurality of first pixels of the pixels are coupled to the first common electrodes, each of the first pixels is coupled to a corresponding one of the first common electrodes, a plurality of second pixels of the pixels are coupled to the second common electrodes, and each of the second pixels is coupled to a corresponding one of the second common electrodes, wherein the second common electrode of a pixel located on a (i+1)th data line and a jth scan line is directly coupled to the second common electrode of a pixel located on a ith data line and a (j+1)th scan line through a first wire, and the second common electrode of the pixel located on the ith data line and the (j+1)th scan line is directly coupled to the second common electrode of a pixel located on the (i+1)th data line and a (j+2)th scan line through a second wire, wherein i and j are positive integers, wherein the first common electrode of a pixel located on a (i+2)th data line and the jth scan line is directly coupled to the first common electrode of a pixel located on a (i+1)th data line and the (j+1)th scan line through a third wire, and the first common electrode of the pixel located on the (i+1)th data line and the (j+1)th scan line is directly coupled to the first common electrode of a pixel located on the (i+2)th data line and the (j+2)th scan line through a fourth wire.

* * * * *